US012689658B2

(12) United States Patent
Hill

(10) Patent No.: US 12,689,658 B2
(45) Date of Patent: Jul. 21, 2026

(54) ACCESS BRIDGE FOR ACCESS CONTROL METHODOLOGY MIGRATION

(71) Applicant: Microsoft Technology Licensing, LLC, Redmond, WA (US)

(72) Inventor: David Alan Hill, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 239 days.

(21) Appl. No.: 18/474,159

(22) Filed: Sep. 25, 2023

(65) Prior Publication Data

US 2025/0106259 A1 Mar. 27, 2025

(51) Int. Cl.
*H04L 9/40* (2022.01)
(52) U.S. Cl.
CPC ............ *H04L 63/20* (2013.01); *H04L 63/104* (2013.01)
(58) Field of Classification Search
CPC ............................. H04L 63/20; H04L 63/104
USPC ............................................................ 726/1
See application file for complete search history.

(56) References Cited

U.S. PATENT DOCUMENTS

| | | | | |
|---|---|---|---|---|
| 2017/0093817 | A1* | 3/2017 | Khoury | H04L 9/3073 |
| 2019/0362087 | A1* | 11/2019 | Ferrans | H04L 63/102 |
| 2021/0029132 | A1* | 1/2021 | Wilczynski | H04L 63/104 |
| 2021/0386964 | A1* | 12/2021 | Youngblood | A47C 27/085 |
| 2023/0129276 | A1* | 4/2023 | Satake | G06F 21/6218 726/26 |
| 2024/0356947 | A1* | 10/2024 | Gopalakrishna | H04L 63/1425 |

* cited by examiner

*Primary Examiner* — Anthony D Brown
(74) *Attorney, Agent, or Firm* — Alleman Hall LLP

(57) ABSTRACT

Implementations of an access bridge to facilitate migration from a role-based access control management system to an attribute-based access control management system are provided. One aspect provides a computing system comprising processing circuitry coupled to memory that stores instructions, which, upon execution by the processing circuitry, cause the processing circuitry to: identify a role-based protected resource; identify a set of user accounts permitted to access the role-based protected resource; query a set of attributes associated with the identified set of user accounts; coalesce the set of attributes to determine instances of each attribute among the identified set of user accounts; generate a set of candidate attribute-based access control policies using the coalesced set of attributes; implement an attribute-based access control policy from the set of candidate attribute-based access control policies; and convert the role-based protected resource into an attribute-based protected resource associated with the implemented attribute-based access control policy.

16 Claims, 6 Drawing Sheets

500

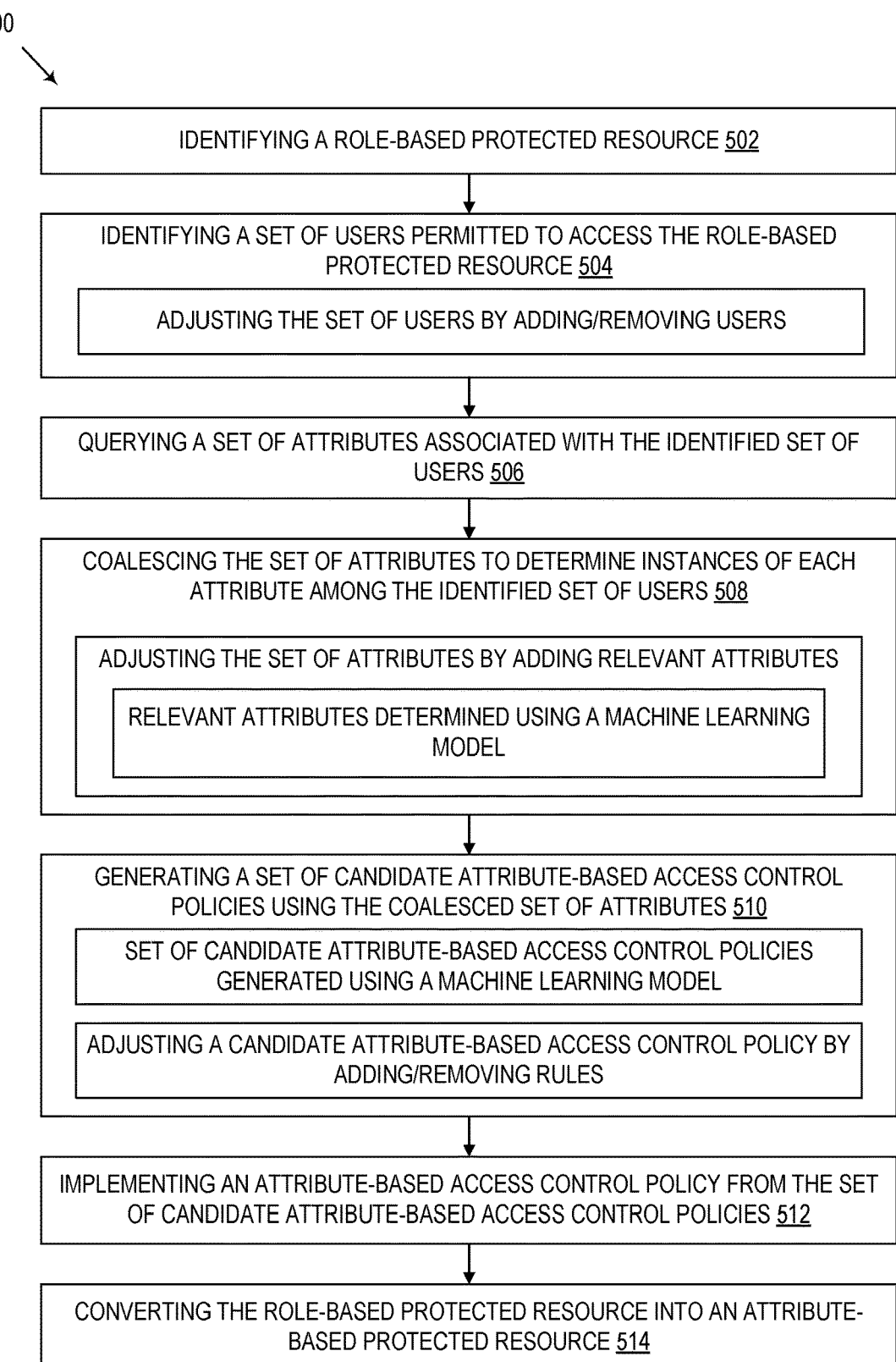

IDENTIFYING A ROLE-BASED PROTECTED RESOURCE 502

IDENTIFYING A SET OF USERS PERMITTED TO ACCESS THE ROLE-BASED PROTECTED RESOURCE 504

ADJUSTING THE SET OF USERS BY ADDING/REMOVING USERS

QUERYING A SET OF ATTRIBUTES ASSOCIATED WITH THE IDENTIFIED SET OF USERS 506

COALESCING THE SET OF ATTRIBUTES TO DETERMINE INSTANCES OF EACH ATTRIBUTE AMONG THE IDENTIFIED SET OF USERS 508

ADJUSTING THE SET OF ATTRIBUTES BY ADDING RELEVANT ATTRIBUTES

RELEVANT ATTRIBUTES DETERMINED USING A MACHINE LEARNING MODEL

GENERATING A SET OF CANDIDATE ATTRIBUTE-BASED ACCESS CONTROL POLICIES USING THE COALESCED SET OF ATTRIBUTES 510

SET OF CANDIDATE ATTRIBUTE-BASED ACCESS CONTROL POLICIES GENERATED USING A MACHINE LEARNING MODEL

ADJUSTING A CANDIDATE ATTRIBUTE-BASED ACCESS CONTROL POLICY BY ADDING/REMOVING RULES

IMPLEMENTING AN ATTRIBUTE-BASED ACCESS CONTROL POLICY FROM THE SET OF CANDIDATE ATTRIBUTE-BASED ACCESS CONTROL POLICIES 512

CONVERTING THE ROLE-BASED PROTECTED RESOURCE INTO AN ATTRIBUTE-BASED PROTECTED RESOURCE 514

FIG. 5

ACCESS BRIDGE FOR ACCESS CONTROL METHODOLOGY MIGRATION

BACKGROUND

In security administration, access control can be implemented to restrict system access to authorized users. Various types of access control schemes have been contemplated. Role-based access control (RBAC) is an access control mechanism defined around roles. Instead of individual discretionary-based permission grants, access to resources (e.g., data objects and services) is granted based on the user's membership in particular roles. With RBAC, access security can be managed for groups of employees/users, which can help simplify security administration for large organizations. For example, within an organization, roles can be created for various job functions. Instead of individually assigning permissions, management of user access to resources for performing the job functions related to a specific role can be implemented by assigning said role to the user(s). Changes in access rights can be made for a given role, which in turn affects all users with the given role and future users assigned with the given role.

Another access control scheme includes attribute-based access control (ABAC). In ABAC, system access is determined by evaluating attributes associated with various related entities. For example, attributes can be associated to the user, the resource being accessed, the requested operation(s) on the resource, the environment, etc. Attributes can be highly adaptable and customized, making ABAC suitable for use in distributed or rapidly changing environments. For example, attribute values can be atomic-valued or set-valued, where a set-valued attribute contains more than one atomic value. Unlike RBAC, ABAC can express complex rule sets that can evaluate many different attributes. Generally, ABAC policies are typically implemented with computational language and Boolean logic to evaluate the relevant attributes.

SUMMARY

Implementations of an access bridge to facilitate migration from a role-based access control management system to an attribute-based access control management system are provided. One aspect provides a computing system comprising processing circuitry coupled to memory that stores instructions, which, upon execution by the processing circuitry, cause the processing circuitry to: identify a role-based protected resource; identify a set of user accounts permitted to access the role-based protected resource; query a set of attributes associated with the identified set of user accounts; coalesce the set of attributes to determine instances of each attribute among the identified set of user accounts; generate a set of candidate attribute-based access control policies using the coalesced set of attributes; implement an attribute-based access control policy from the set of candidate attribute-based access control policies; and convert the role-based protected resource into an attribute-based protected resource associated with the implemented attribute-based access control policy.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 shows a flow chart of an example method for migrating an RBAC resource to an ABAC resource, which can be implemented using the computing system of FIG. 1.

DETAILED DESCRIPTION

Figure 1:
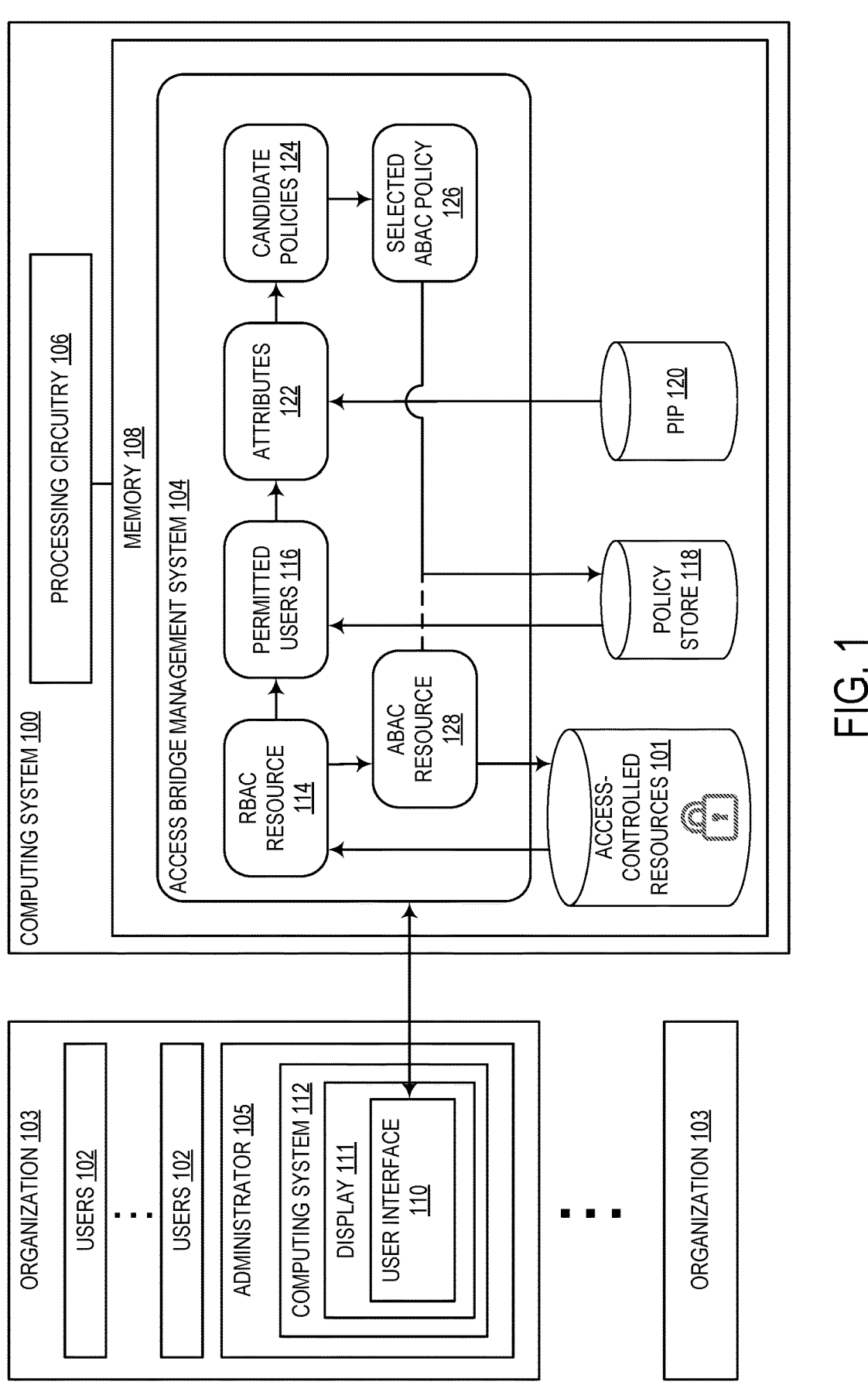
FIG. 1 shows a schematic view of an example computing system for implementing an access bridge for access control methodology migration.

Attribute-based access control solutions are often in heavy demand by various organizations for their granular control in security access. For organizations currently implementing other access control solutions (e.g., role-based access control), switching to an attribute-based solution can be non-trivial, especially for larger systems at scale. For example, highly regulated institutions (e.g., financial institutions, governments, oil & gas companies, etc.) often implement complex systems and switching from one access control methodology to another methodology can result in significant disruption in workflow and downtime.

In view of the observations above, implementations of an access bridge for facilitating migration of an access control methodology to a different methodology are provided. An access bridge can be implemented as a centralized policy management system that enables dual access control methodologies to coexist simultaneously, providing access to protected resources during the migration process. Such implementations allow for an organization to gradually and securely transition from one access control methodology to another with little to no disruption to existing systems and workflows. In some implementations, the access bridge enables both RBAC and ABAC policies to be enforced simultaneously. For example, the access bridge can provide a centralized policy management system that allows administrators, such as accounts with administrator privileges, to configure, monitor, and enforce access control polices for both RBAC and ABAC protection schemes, allowing for migration from an RBAC system to an ABAC system (or vice versa). Access policies can be created and modified based on roles and attributes. Accordingly, the access bridge can be implemented to support the definition of policies using a combination of role-based and attribute-based elements such that administrators can associate roles with specific attributes, conditions, or environmental factors to define granular and context-aware access rules.

The access bridge can provide seamless integration of RBAC and ABAC policies so that both methodologies can function simultaneously during the migration period. The integration of both policies facilitates the incorporation of the access bridge into existing systems, user directories, and other access control solutions used within an organization, allowing for the synchronization of user data, roles, and attributes and enabling a unified view of access rights across RBAC and ABAC policies. The access bridge can also provide administrators with the capability to convert existing policies of one access control methodology into to another access control methodology. For example, tools that implement programmatically assisted and data driven processes can be provided to convert existing RBAC policies into equivalent ABAC policies (or vice versa). The policy conversion from one methodology to another can be performed automatically, manually, or some combination of the two where the administrator provides input on the conversion process.

To convert an RBAC policy into an ABAC policy, the access bridge can provide tools that allow administrators to define, manage, and map attributes to relevant user roles and resources. This provides consistency and accuracy in attribute usage across the organization. To provide feedback on the correctness and effectiveness of the access control policies, the user interface of the access bridge can include a policy simulation and/or testing module. With such tools, administrators can simulate access decisions based on different scenarios, verifying the results of both RBAC and ABAC rules before full deployment. The access bridge can provide auditing capabilities to track and log access control activities, which can assist organizations in meeting regulatory compliance requirements by maintaining an auditable record of access decisions made using both methodologies. The access bridge can also provide real-time monitoring and reporting features to help organizations identify access anomalies and potential security threats. Administrators can receive alerts and notifications about suspicious access patterns, enhancing the overall security posture.

An access bridge implementing a policy management system for dual access control methodologies provides several advantages over existing management systems, including technical advantages such as seamless integration, unified policy management, consistent user identity and attributes, intelligent access decisions, scalability and performance, advanced reporting and auditing, secure authentication, and continuous updates. In some implementations, the access bridge seamlessly integrates with widely adopted cloud-based identity and access management services, taking advantage of such services' capabilities. For example, the access bridge can take advantage of the management services' reporting and auditing capabilities to allow organizations to gain insights into access patterns, identify potential security risks, and meet compliance requirements by generating detailed access logs and reports. In another example, the access bridge can leverage multi-factor authentication and/or conditional access policies of existing management services to ensure that only authorized users with the appropriate attributes can access resources.

Integrating the access bridge with an existing management service allows organizations to leverage their existing user directories, groups, and access control configurations in such services for RBAC. At the same time, the access bridge can utilize the attributes and conditional access features of the existing management service to implement ABAC more efficiently. Integrating the access bridge with an existing policy management service also provides consistency in user information across the access control process. The existing management service can serve as an authoritative source for user identity and attributes, making it easier for the access bridge to map user attributes to roles or conditions for ABAC. This consistency enhances security and reduces the risk of errors or conflicts in access control policies.

Briefly, implementations of an access bridge for facilitating migration from an RBAC management system to an ABAC management system are provided. In some implementations, tools are provided for an administrator to gradually convert role-based protected resources to attribute-based protected resources. An administrator can select one or more role-based protected resources to be converted. Corresponding attribute-based access control policies are generated and recommended to the administrator based on the selected resource(s). Various methods for generating policies to recommend can be implemented. Recommendations can be provided based on various criteria, such as the percentage of users covered by generated policies. In some implementations, the access bridge provides tooling that allows an administrator to visualize the impact of recommended policies on the users. For example, the access bridge can provide information describing additional users that satisfy the recommended policies and/or users that do not satisfy the recommended policies but were permitted to access the role-based protected resource to be converted. Once the administrator decides which policy to enact, the conversion process is finalized by saving the selected policy to the policy store and converting the selected role-based protected resource to an attribute-based protected resource associated with the selected policy.

Turning now to the drawings, access bridges for facilitating migration from an RBAC management system to an ABAC management system are described in further detail. An access bridge can be implemented as a centralized policy management system for various access control systems, including cloud-based access-controlled storage solutions. FIG. 1 shows a schematic view of an example computing system 100 for implementing an access bridge for access control methodology migration. The example computing system 100 can be implemented as a server system providing a storage solution. For example, the computing system 100 can be provided as a cloud-storage solution or a local storage server providing security access to access-controlled resources 101 for users 102 of one or more organizations 103. Users 102 can represent user accounts associated with an organization 103. The example computing system 100 implements an access bridge management system 104 that provides administrators 105 with tools for migrating from a role-based access control methodology to an attribute-based access control methodology.

The example computing system 100 includes processing circuitry 106 and memory 108. Processing circuitry 106, which can be implemented as a set of processors, is configured to execute instructions stored in memory 108 for performing the various processes described herein. The access bridge management system 104 provides a centralized point for administrators 105 of organizations 103 to generate attribute-based access control policies for the migration of role-based protected resources to attribute-based access control resources. The access bridge management system 104 provides various tools for an administrator 105 to facilitate such a process. For example, in the depicted example, the access bridge management system 104 provides a user interface 110 displayed on the display 111 of an administrator's system 112. Through the user interface 110, the administrator 105 selects and transmits information indicating their selection of a role-based protected resource 114 to be converted.

Based on the received information describing the role-based protected resource 114, the access bridge management system 104 identifies a set of user accounts 116 permitted to access the role-based protected resource 114. The set of user accounts 116 can be identified by querying a policy store 118 for the role-based access control policy controlling access to the role-based protected resource 114. Role(s) permitted to access the role-based protected resource 114 are queried to determine the set of user accounts 116 permitted to access the resource 114 (i.e., the user accounts assigned such role(s)). The access bridge management system 104 then queries attributes associated with the set of user accounts 116 permitted to access the resource 114 from a policy information point (PIP) database 120 to determine a set of attributes 122.

The set of attributes 122 are coalesced to determine relevant attributes with which to craft attribute-based access policies. Attributes can be coalesced into like measures, such as by volume, pattern of use, relationship, or any other identified measures to prioritize for policy definition. The set of relevant attributes can be adjusted. For example, the administrator 105 can, via the user interface 110, indicate additional attribute(s) to be added to the set. Attributes unrelated to the user accounts, such as attributes related to the protected resource, the environment, the intended operation, etc., can be added. In some implementations, the computing system 100 includes a machine learning model for identifying additional relevant attributes. Machine learning techniques can be applied to analyze underlying data and interpolate attributes that may be relevant based on certain criteria.

From the coalesced attributes, the access bridge management system 104 generates a set of candidate attribute-based access control policies 124, which can be presented to the administrator 105 (e.g., through the user interface 110). Candidate attribute-based access control policies 124 can be generated based on predetermined criteria. In some implementations, the predetermined criteria include the percentage of the identified set of user accounts 116 that satisfy the candidate attribute-based access control policy 124. Another example predetermined criterion includes the number of attributes that define the candidate attribute-based access control policy 124. For example, a policy with fewer attribute rules may be more desirable for simplicity. Multiple criteria can be applied simultaneously with different weights and optimization schemes. In some implementations, the set of candidate attribute-based access control policies 124 is generated using a machine learning model that determines relevant attributes to define the set of candidate attribute-based access control policies 124. Machine learning techniques can be applied to generate policy rules with certain predetermined criteria optimized.

The set of candidate access control policies 124 can be scored across different measures (e.g., percentage of the set of user accounts covered, total number of user accounts covered, number of rules incorporated, etc.) to provide information for the administrator 105 to decide on which candidate access control policy 124 to implement. The access bridge management system 104 can provide tools that help the administrator 105 to visualize the impact of the candidate attribute-based access control policies 124 on the user population 102. For example, information describing a percentage of the identified set of user accounts 116 and/or a total number of user accounts that satisfy the candidate attribute-based access control policy 124 can be determined and provided to the administrator 105 (e.g., visually provided through the user interface 110). As can be readily appreciated, the information describing the number of user accounts can describe a user account 102 not in the identified set of user accounts 116 permitted to access the role-based protected resource 114.

The administrator 105 selects an attribute-based access control policy 126 from the candidate policies 124 to implement, and the migration process for the role-based protected resource 114 is finalized. The selected attribute-based access control policy 126 is saved to the policy store 118, and the role-based protected resource 114 is converted into an attribute-based protected resource 128 associated with the selected attribute-based access control policy 126.

The access bridge and migration process described above can be applied with other access control methodologies. Similar principles can be applied in reverse to perform an ABAC-to-RBAC migration. Role-based and attribute-based access control methodologies provide different advantages depending on the application. Generally, role-based access control methodologies are simpler to implement and provide a high-level application of access security. Attribute-based access control methodologies allow for more control of access security, providing the capabilities of generating and enforcing complex policies.

Figure 2:
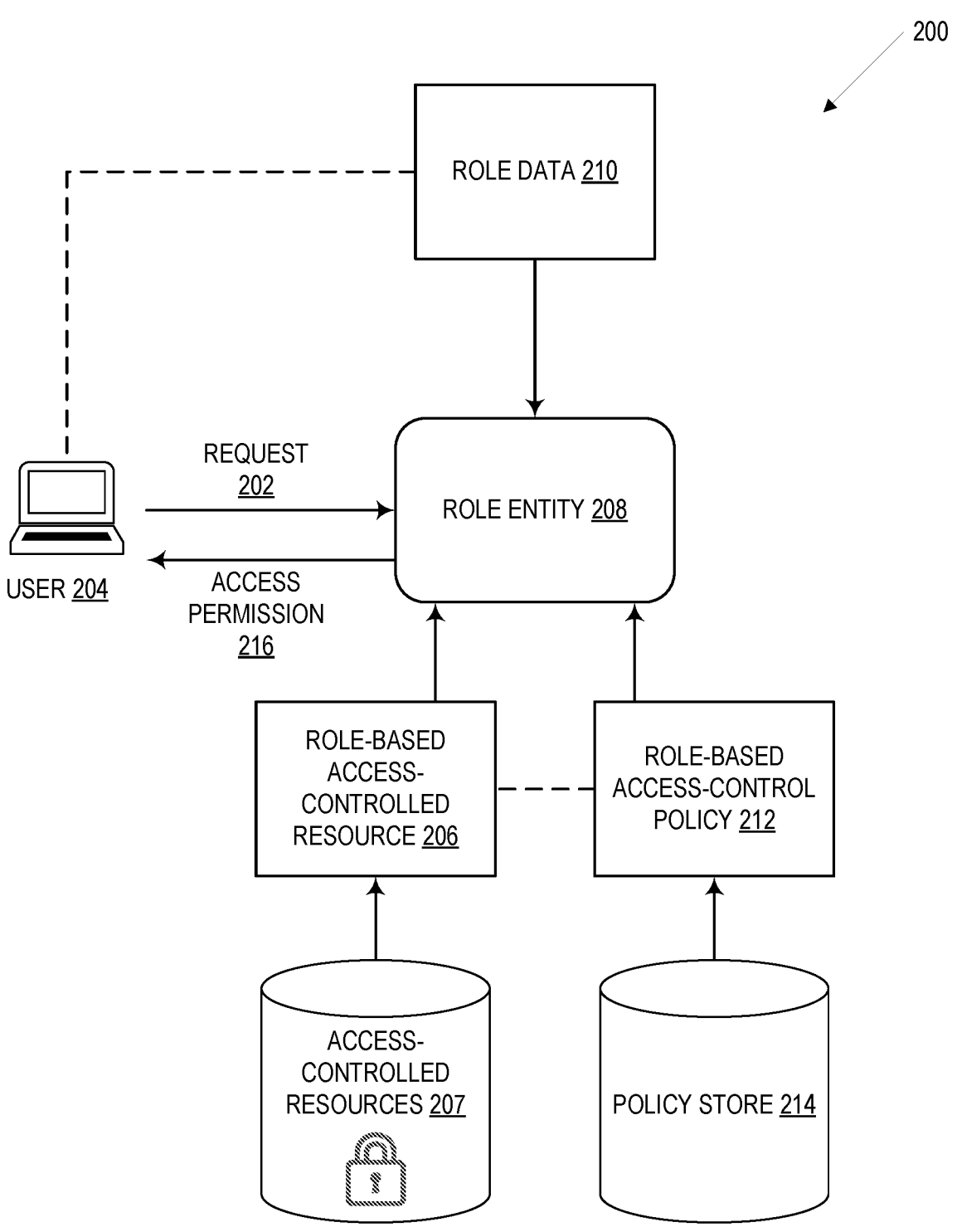
FIG. 2 shows a model of an example role-based access control methodology.

FIG. 2 shows a model 200 of an example role-based access control methodology. The RBAC process starts with a request 202 from a user 204, such as a user account associated with an organization, to access a role-based access-controlled resource 206 from a database of role-based access-controlled resources 207. A role entity 208 receives the request 202 and enforces whether the user 204 can access the role-based access-controlled resource 206. The role entity 208 determines the role(s) 210 assigned to the user 204 and validates them against a role-based access control policy 212 retrieved from a policy store 214 that governs the role-based access-controlled resource 206. Upon validation that the role(s) 210 of the user 204 are permitted to access the role-based access-controlled resource 206, the role entity 208 grants access permissions 216 accordingly.

Roles are predefined and can provide a high-level structure for managing access rights. For example, roles can describe a job title, a seniority level, a department, a geographic location, etc. Roles can be assigned to users in various ways. For example, roles can be assigned automatically and/or manually. In some implementations, roles are automatically assigned to users whose data meet certain criteria for a given role. For example, upon creation of a user account, data of the user can be stored in a policy information point database (such as PIP database 120 of FIG. 1). Users with PIP data that meets certain criteria for a given role can be automatically assigned to that role. User data can be updated, and roles can be updated accordingly. A user 204 can have multiple roles, and the access control policy 212 can define multiple roles that are permitted access to the associated resource. The access control policy 212 can also define whether only one role or multiple roles are needed by the same user to access the resource 206.

Figure 3:
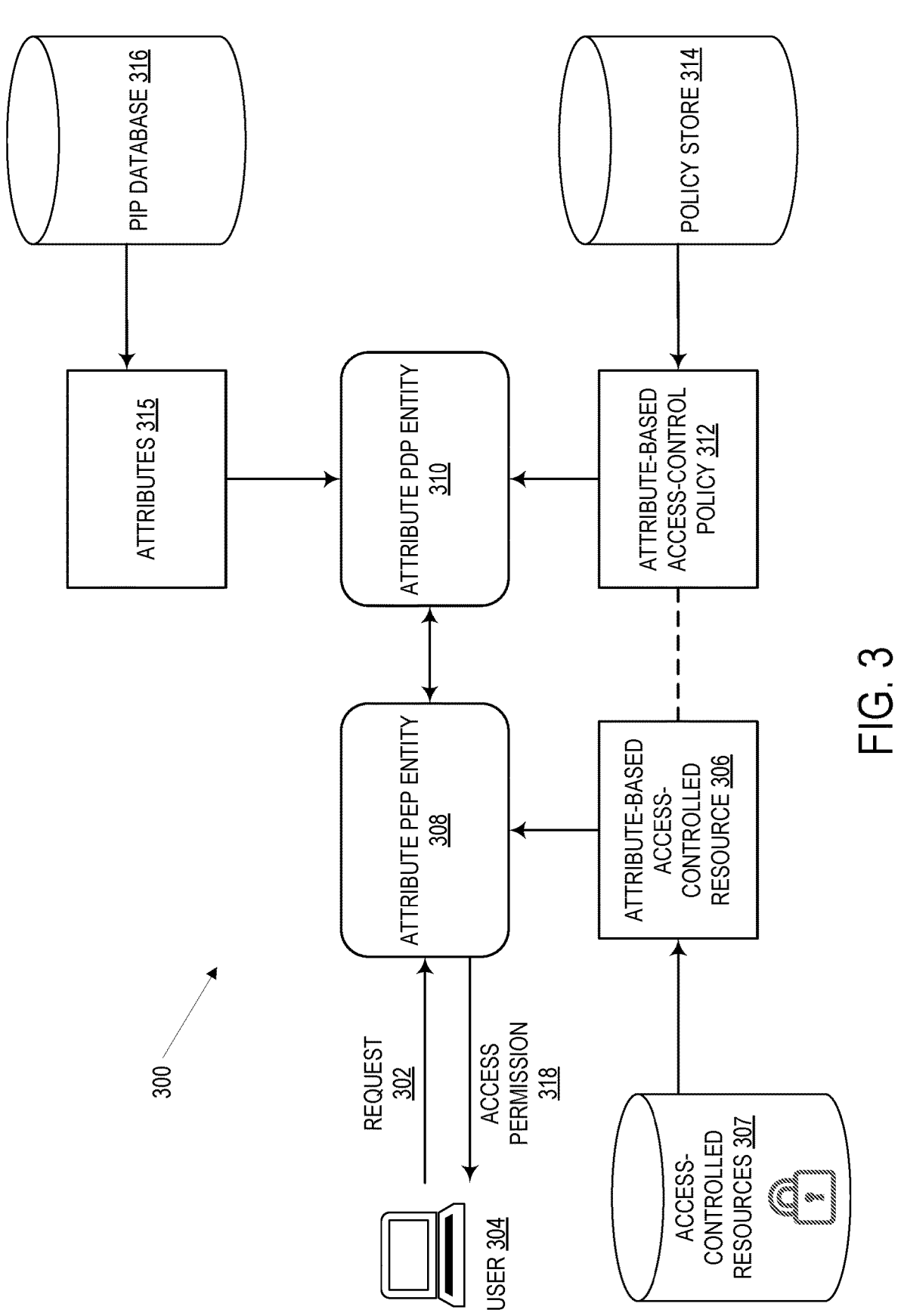
FIG. 3 shows a model of an example attribute-based access control methodology.

Although role-based access control methodologies provide a high-level structure within which access rights can be managed, they lack granularity and the ability to provide more complex control over access rights. In some applications, higher levels of control are desirable. In such cases, an attribute-based access control methodology can be implemented. FIG. 3 shows a model 300 of an example attribute-based access control methodology. The ABAC process starts with a request 302 from a user 304, such as a user account associated with an organization, to access an attribute-based access-controlled resource 306 from a database of attribute-based access-controlled resources 307. An attribute PEP entity 308 receives the request 302 and transmits it to an attribute PDP entity 310.

The attribute PDP entity 310 validates the access request by evaluating an attribute-based access policy 312 associated with the attribute-based access-controlled resource 306. Access control policy 312 can be stored in and retrieved from a policy store 314. The attribute PDP entity 310 retrieves attributes 315 associated with the attribute-based access policy 312 and evaluates them against the attribute-based access policy 312 to determine an access decision. Attributes 315 may be stored in and retrieved from a PIP database 316. The access decision is provided to the attribute PEP entity 308, which then enforces whether the user 304 can access the resource 306 based on the access decision. If the access decision indicates that the user 304 is permitted to access the attribute-based access-controlled resource 306, the attribute PEP entity 308 grants access permission 318 accordingly.

In contrast to predefined roles, attributes provide more precise control over access decisions. An attribute can include values of various formats and can be related to entities other than the user. For example, an access control policy for an access-controlled resource can define that access to said resource is permitted before a certain date. When a request to access the resource is to be validated, the current date is queried as an attribute and evaluated against the access control policy. Upon validation that the access control policy is satisfied, access is granted accordingly.

Figure 4:
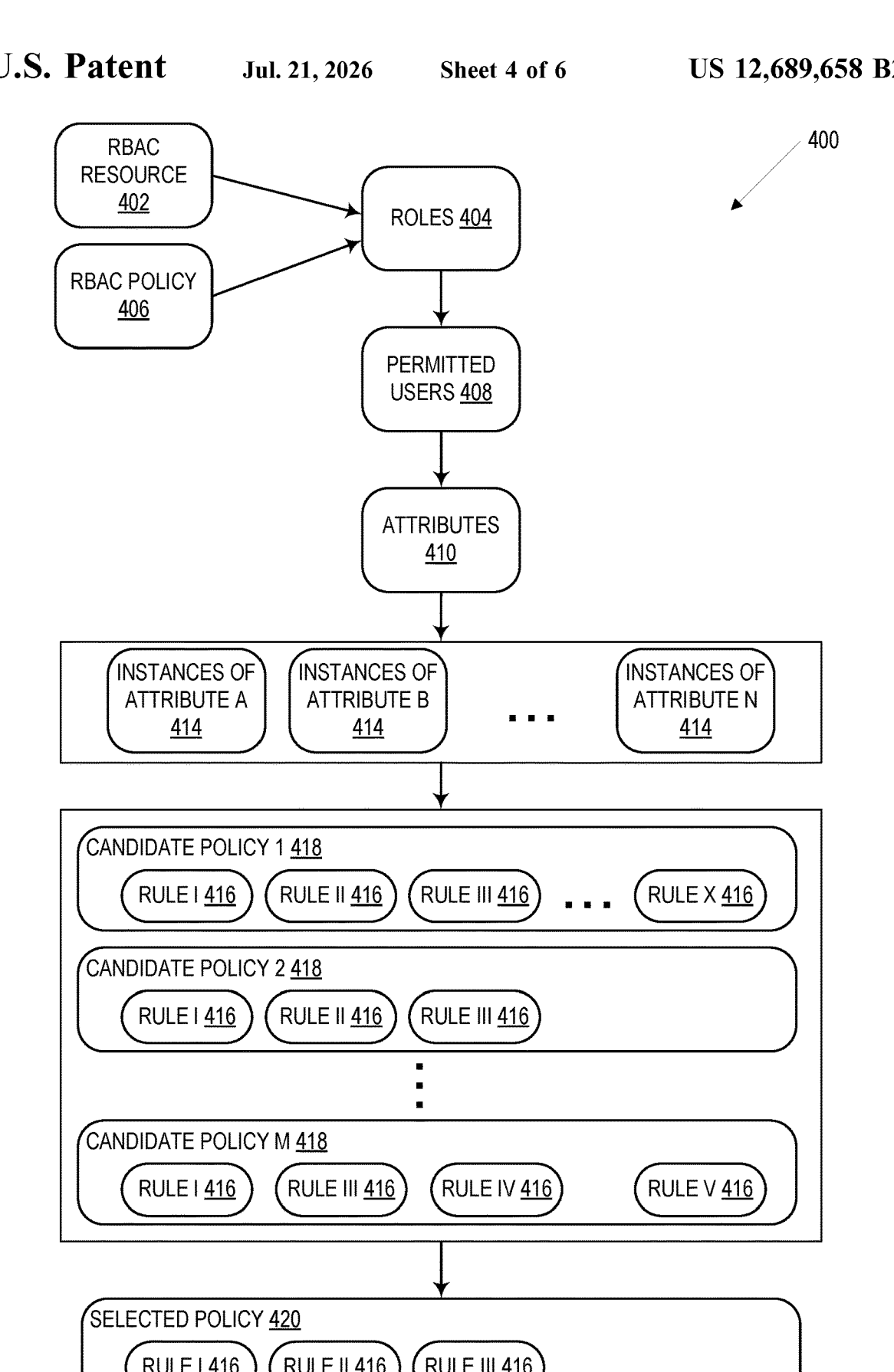
FIG. 4 shows a model of an example data flow of a migration process of an RBAC resource to an ABAC resource, which can be implemented using the computing system of FIG. 1.

FIG. 4 shows a model of an example data flow 400 of a migration process of an RBAC resource to an ABAC resource. The data flow 400 starts with a role-based protected resource 402 to be converted. Multiple resources can be converted in a single process. To determine group membership for the role-based protected resource 402, role(s) 404 described in the role-based access control policy 406 associated with the role-based protected resource 402 are used to query and determine a set of user accounts 408 permitted to access the resource 402. In some implementations, the set of user accounts 408 is adjusted. For example, the administrator can add or remove user accounts to the set 408 to target a desired population (e.g., adding a user account that the administrator desires to have security access to the role-based protected resource 402).

Attributes 410 associated with the set of user accounts 408 can be queried and retrieved. The attributes 410 are coalesced by like measures (e.g., by volume, pattern of use, relationship, etc.) to determine relevant attributes in the migration process. Different criteria can be used depending on the administrator's preference. From the coalesced attributes, instances 414 of relevant attributes can be determined and used to craft various rules 416 defining access control based on the relevant attributes. The set of relevant attributes can be adjusted. For example, the administrator can manually add attributes to the set. In some implementations, a machine learning model is applied to identify additional relevant attributes. Machine learning techniques can be applied to analyze underlying data and interpolate attributes that may be relevant based on certain criteria.

The rules 416 describe attributes for access control and can be used to generate an attribute-based access control policy. Different combinations of the rules 416 can be used to generate a set of candidate attribute-based access control policies 418. The set of candidate policies 418 provides options for the administrator to evaluate and decide on which to implement. The selected policy 420 is then saved to a policy store and implemented to control security access to protected resource 402 after it is converted to an attribute-based protected resource.

The set of candidate policies 418 can be generated based on various criteria. In some implementations, a machine learning model is applied to generate the set of candidate policies 418. The machine learning model can apply learning techniques using previously selected access policies as training data, leading to more personalized recommendation for a given administrator over time. In some implementations, tools are provided to score the policies 418 across different measures (e.g., percentage of the set of user accounts 408 covered, total number of user accounts covered, number of rules incorporated, etc.). The scores can provide information for the administrator to decide on their preferred policy. The candidate policies 418 can also be adjusted. For example, the administrator can manually add or remove rules 416 from a candidate policy 418. Rules unrelated to the original set of rules 416 can be added. For example, attributes not related to the set of user accounts 408 (e.g., attributes related to the resource 402, the environment, the intended operation, etc.) can be used to craft a rule that can be added to a candidate policy 418.

FIG. 5 shows a flow chart of an example method 500 for migrating an RBAC resource to an ABAC resource, which can be implemented using the computing system of FIG. 1. The method 500 includes, at step 502, identifying a role-based protected resource. One or more role-based protected resources to be converted can be identified. In some implementations, the role-based protected resource is identified by an administrator operating a user interface of the access bridge. The administrator can select one or more role-based protected resources to be converted.

At step 504, the method 500 includes identifying a set of user accounts permitted to access the role-based protected resource. The set of user accounts permitted to access the role-based protected resource can be identified in various ways. For example, the set of user accounts can be identified using a role-based access control policy associated with the role-based protected resource. The role-based access control policy can describe role(s) that are permitted access, and user data can be queried to identify user accounts assigned said role(s). The identified set of user accounts can be displayed (e.g., through the user interface), providing the administrator with visual confirmation of the expected group population. The access bridge can provide tools that enable an administrator to adjust the identified set of user accounts permitted to access the role-based protected resource. For example, tooling can be implemented to allow the administrator to manually add or remove user accounts to the set, allowing for the administrator to define a target population.

At step 506, the method 500 includes querying a set of attributes associated with the identified set of user accounts. In some implementations, the identified set of user accounts is adjusted, and the set of attributes of the adjusted set of user accounts is queried. Attributes assigned to user accounts can be queried from a policy information point database, which acts as an attribute store.

At step 508, the method 500 includes coalescing the set of attributes to determine instances of each attribute among the identified set of user accounts. Attributes can be coalesced into like measures, such as by volume, pattern of use, relationship, or any other identified measures to prioritize for policy definition. In some implementations, the attribute set is adjusted. For example, additional attributes can be added. Attributes not associated with the identified set of user accounts permitted to access the role-based protected resource can be added to the set. In some implementations, a machine learning model is applied to identify additional relevant attributes. Machine learning techniques can be applied to analyze underlying data and interpolate attributes that may be relevant based on certain criteria.

At step 510, the method 500 includes generating a set of candidate attribute-based access control policies based on attributes associated with the identified set of user accounts. The set of candidate attribute-based access control policies can be generated using the coalesced set of attributes. As described above, the set can be adjusted with the addition or removal of attributes. Attributes not associated with the identified set of user accounts can also be used. For example, attributes related to the environment or object can be used (e.g., an attribute specifying that the object may be accessed only if the current date is before a predetermined date). Candidate attribute-based access control policies can be generated based on predetermined criteria. In some implementations, the predetermined criteria include the percentage of the identified set of user accounts that satisfy the candidate attribute-based access control policy. Another example predetermined criterion includes the number of attributes that define the candidate attribute-based access control policy. For example, a policy with fewer attribute rules may be more desirable for simplicity. Multiple criteria can be applied simultaneously with different weights and optimization schemes.

The set of candidate access control policies can be scored across different measures (e.g., percentage of the set of user accounts covered, total number of user accounts covered, number of rules incorporated, etc.) to provide information for the administrator to decide on which candidate access control policy to implement. Information from other policies in the policy store can also be used for comparison. The access bridge can provide tools that help an administrator to visualize the impact of the candidate attribute-based access control policies on the user population. For example, information describing a percentage of the identified set of user accounts and/or a total number of user accounts that satisfy the candidate attribute-based access control policy can be determined and provided to the administrator (e.g., visually provided through a user interface). In some cases, the information describing the number of user accounts describes at least one user account not in the identified set of user accounts permitted to access the role-based protected resource. Such information can guide the administrator in selecting which access policy to implement for the role-based protected resource.

Oftentimes, the sensitivity of underlying data requires protection beyond any existing extracted attributes. In some implementations, the set of candidate attribute-based access control policies is generated using a machine learning model that determines relevant attributes to define the set of candidate attribute-based access control policies. Machine learning techniques can be applied to generate policy rules with certain predetermined criteria optimized. Machine learning models for generating policy rules can be trained in various ways. For example, the machine learning model can be trained using a previously implemented attribute-based access control policy. Information regarding an access control policy selected to be implemented from the set of candidate access control policies can provide context and training data describing the administrator's preference.

At step 512, the method 500 includes implementing an attribute-based access control policy from the set of candidate attribute-based access control policies. The access control policy to implement can be selected from the candidate access control polices by the administrator. The method 500 can include receiving information describing a selected attribute-based access control policy from the set of candidate attribute-based access control policies and implementing the selected attribute-based access control policy. In some implementations, an attribute-based access control policy from the set of candidates is adjusted. For example, before implementing an attribute-based access control policy, the policy can be adjusted based on input from an administrator. Rules can be added or removed from the policy to further tailor the policy to the administrator's preference. Information describing the effects of the adjustment can be determined and provided. For example, information describing a percentage of the identified set of user accounts and/or a total number of user accounts that satisfy the adjusted access control policy can be determined and provided to the administrator. Upon finalizing which access control policy to implement, the selected policy can be saved to the policy store. In some implementations, metadata is established and stored to help the administrator or their successor to identify and administer the policy in the future.

At step 514, the method 500 includes converting the role-based protected resource into an attribute-based protected resource associated with the implemented attribute-based access control policy. The access bridge can provide tools that could programmatically remove the role-based access security of the protected resource and add new security access based on the implemented attribute-based access control policy.

The systems and methods described herein provide implementations of an access bridge management system that provides organizations with a gradual migration process from one access control methodology to another with little to no disruption to existing systems. The access bridge can provide seamless integration of access control policies with different methodologies, facilitating the incorporation of the access bridge into existing systems. This allows the access bridge management system to leverage various existing systems, including auditing systems and authentication systems. The access bridge can also provide administrators with tools that implement programmatically assisted and data driven processes. Such processes can utilize a policy simulation and/or testing module that provides feedback to the administrators regarding the effects of candidate/recommended access control policies before actual deployment.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
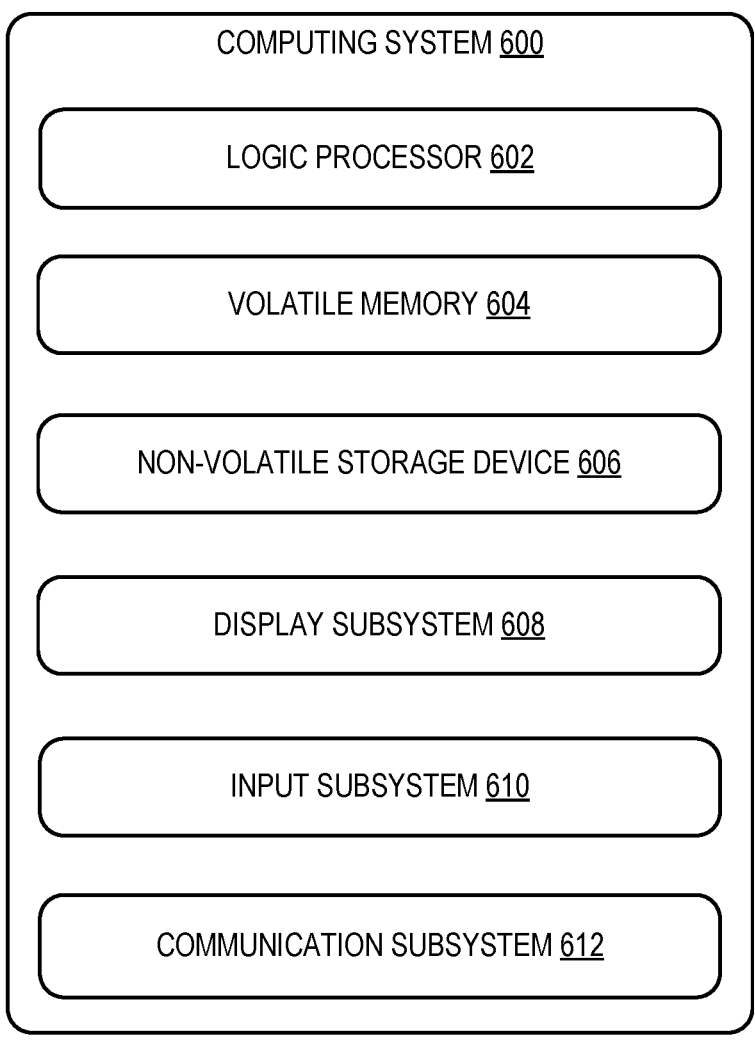
FIG. 6 shows a schematic view of an example computing system, which can be implemented in the computing system of FIG. 1.

FIG. 6 schematically shows a non-limiting embodiment of a computing system 600 that can enact one or more of the methods and processes described above. Computing system 600 is shown in simplified form. Computing system 600 may be implemented as or part of the computing system 100 described above and illustrated in FIG. 1. For example, computing system 600 may be a computing device implemented as a component of computing system 100. Components of computing system 600 may be included in one or more personal computers, server computers, tablet computers, home-entertainment computers, network computing devices, video game devices, mobile computing devices, mobile communication devices (e.g., smartphone), and/or other computing devices, and wearable computing devices such as smart wristwatches and head mounted augmented reality devices.

Computing system 600 includes a logic processor 602 volatile memory 604, and a non-volatile storage device 606. Computing system 600 may optionally include a display subsystem 608, input subsystem 610, communication subsystem 612, and/or other components not shown in FIG. 6.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built in. Non-volatile storage device 606 may include optical memory, semiconductor memory, and/or magnetic memory, or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, camera, or microphone.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 600 to send and/or receive messages to and/or from other devices via a network such as the Internet.

The following paragraphs provide additional description of the subject matter of the present disclosure. One aspect provides a computing system for implementing an access bridge to facilitate migration from a role-based access control management system to an attribute-based access control management system, the computing system comprising: processing circuitry coupled to memory that stores instructions, which, upon execution by the processing circuitry, cause the processing circuitry to: identify a role-based protected resource; identify a set of user accounts permitted to access the role-based protected resource; query a set of attributes associated with the identified set of user accounts; coalesce the set of attributes to determine instances of each attribute among the identified set of user accounts; generate a set of candidate attribute-based access control policies using the coalesced set of attributes, each candidate attribute-based access control policy generated based on a predetermined criterion; implement an attribute-based access control policy from the set of candidate attribute-based access control policies; and convert the role-based protected resource into an attribute-based protected resource associated with the implemented attribute-based access control policy. In this aspect, additionally or alternatively, execution of the instructions further causes the processing circuitry to: for each candidate attribute-based access control policy, determine and provide information describing a percentage of the identified set of user accounts that satisfy the candidate attribute-based access control policy. In this aspect, additionally or alternatively, execution of the instructions further causes the processing circuitry to: for each candidate attribute-based access control policy, determine and provide information describing a number of user accounts that satisfy the candidate attribute-based access control policy. In this aspect, additionally or alternatively, the information describing the number of user accounts describes at least one user account not in the identified set of user accounts permitted to access the role-based protected resource. In this aspect, additionally or alternatively, execution of the instructions further causes the processor to: before implementing the attribute-based access control policy, adjust the attribute-based access control policy based on input from an administrator. In this aspect, additionally or alternatively, execution of the instructions further causes the processor to: determine and provide information describing a number of user accounts that satisfy the adjusted attribute-based access control policy. In this aspect, additionally or alternatively, execution of the instructions further causes the processor to: adjust the identified set of user accounts based on input from an administrator, wherein the set of attributes queried is based on the adjusted set of user accounts. In this aspect, additionally or alternatively, the set of candidate attribute-based access control policies is generated using a machine learning model that determines relevant attributes to define the set of candidate attribute-based access control policies, wherein the machine learning model is trained using a previously implemented attribute-based access control policy. In this aspect, additionally or alternatively, the predetermined criterion is based on a percentage of the identified set of user accounts that satisfy the candidate attribute-based access control policy. In this aspect, additionally or alternatively, the predetermined criterion is based on a number of attributes that define the candidate attribute-based access control policy.

Another aspect provides a method for implementing an access bridge to facilitate migration from a role-based access control management system to an attribute-based access control management system, the method comprising: identifying a role-based protected resource; identifying a set of user accounts permitted to access the role-based protected resource; querying a set of attributes associated with the identified set of user accounts; coalescing the set of attributes to determine instances of each attribute among the identified set of user accounts; generating a set of candidate attribute-based access control policies using the coalesced set of attributes, each candidate attribute-based access control policy generated based on a predetermined criterion; implementing an attribute-based access control policy from the set of candidate attribute-based access control policies; and converting the role-based protected resource into an attribute-based protected resource associated with the implemented attribute-based access control policy. In this aspect, additionally or alternatively, the method further includes, for each candidate attribute-based access control policy, determining and providing information describing a percentage of the identified set of user accounts that satisfy the candidate attribute-based access control policy. In this aspect, additionally or alternatively, the method further includes, for each candidate attribute-based access control policy, determining and providing information describing a number of user accounts that satisfy the candidate attribute-based access control policy. In this aspect, additionally or alternatively, the information describing the number of user accounts describes at least one user account not in the identified set of user accounts permitted to access the role-based protected resource. In this aspect, additionally or alternatively, the method further includes, before implementing the attribute-based access control policy, adjusting the attribute-based access control policy based on input from an administrator. In this aspect, additionally or alternatively, the method further includes determining and providing information describing a number of user accounts that satisfy the adjusted attribute-based access control policy. In this aspect, additionally or alternatively, the method further includes adjusting the identified set of user accounts based on input from an administrator, wherein the set of attributes queried is based on the adjusted set of user accounts. In this aspect, additionally or alternatively, the set of candidate attribute-based access control policies is generated using a machine learning model that determines relevant attributes to define the set of candidate attribute-based access control policies, wherein the machine learning model is trained using a previously implemented attribute-based access control policy. In this aspect, additionally or alternatively, the predetermined criterion is based on a percentage of the identified set of user accounts that satisfy the candidate attribute-based access control policy.

Another aspect provides a computing system for implementing an access bridge to enable migration from a role-based access control management system to an attribute-based access control management system, the computing system comprising: a processor coupled to memory that stores instructions, which, upon execution by the processor, cause the processor to: provide a user interface for converting a role-based protected resource into an attribute-based protected resource; receive information describing a selected role-based protected resource from an administrator operating the user interface; identify a set of user accounts permitted to access the role-based protected resource based on a role-based access control policy associated with the selected role-based protected resource; generate a set of candidate attribute-based access control policies based on attributes associated with the identified set of user accounts; receive information describing a selected attribute-based access control policy from the set of candidate attribute-based access control policies; implement the selected attribute-based access control policy; and convert the selected role-based protected resource into an attribute-based protected resource associated with the implemented attribute-based access control policy.

"And/or" as used herein is defined as the inclusive or ∨, as specified by the following truth table:

| A | B | A ∨ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for implementing an access bridge to facilitate migration from a role-based access control management system to an attribute-based access control management system, the computing system comprising:
   processing circuitry coupled to memory that stores instructions, which, upon execution by the processing circuitry, cause the processing circuitry to:
   identify a role-based protected resource;
   identify a set of user accounts permitted to access the role-based protected resource;
   query a set of user account attributes associated with the identified set of user accounts;
   coalesce the set of user account attributes to determine instances of each attribute among the identified set of user accounts;
   generate a set of candidate attribute-based access control policies using the coalesced set of user account attributes, each candidate attribute-based access control policy generated based on a predetermined criterion;
   for each of the candidate attribute-based access control policies, determine and provide information describing a number of user accounts that satisfy the candidate attribute-based access control policy, wherein the information describing the number of user accounts describes at least one user account not in the identified set of user accounts permitted to access the role-based protected resource;
   implement an attribute-based access control policy from the set of candidate attribute-based access control policies; and
   convert the role-based protected resource into an attribute-based protected resource associated with the implemented attribute-based access control policy.

2. The computing system of claim 1, wherein execution of the instructions further causes the processing circuitry to:
   for each candidate attribute-based access control policy, determine and provide information describing a percentage of the identified set of user accounts that satisfy the candidate attribute-based access control policy.

3. The computing system of claim 1, wherein execution of the instructions further causes the processor to:
   before implementing the attribute-based access control policy, adjust the attribute-based access control policy based on input from an administrator.

4. The computing system of claim 3, wherein execution of the instructions further causes the processor to:
   determine and provide information describing a number of user accounts that satisfy the adjusted attribute-based access control policy.

5. The computing system of claim 1, wherein execution of the instructions further causes the processor to:
   adjust the identified set of user accounts based on input from an administrator, wherein the set of user account attributes queried is based on the adjusted set of user accounts.

6. The computing system of claim 1, wherein the set of candidate attribute-based access control policies is generated using a machine learning model that determines relevant attributes to define the set of candidate attribute-based access control policies, wherein the machine learning model is trained using a previously implemented attribute-based access control policy.

7. The computing system of claim 1, wherein the predetermined criterion is based on a percentage of the identified set of user accounts that satisfy the candidate attribute-based access control policy.

8. The computing system of claim 1, wherein the predetermined criterion is based on a number of attributes that define the candidate attribute-based access control policy.

9. A method for implementing an access bridge to facilitate migration from a role-based access control management system to an attribute-based access control management system, the method comprising:
   identifying a role-based protected resource;
   identifying a set of user accounts permitted to access the role-based protected resource;
   querying a set of user account attributes associated with the identified set of user accounts;
   coalescing the set of user account attributes to determine instances of each attribute among the identified set of user accounts;
   generating a set of candidate attribute-based access control policies using the coalesced set of user account attributes, each candidate attribute-based access control policy generated based on a predetermined criterion;
   for each of the candidate attribute-based access control policies, determining and providing information describing a number of user accounts that satisfy the candidate attribute-based access control policy, wherein the information describing the number of user accounts describes at least one user account not in the identified set of user accounts permitted to access the role-based protected resource;
   implementing an attribute-based access control policy from the set of candidate attribute-based access control policies; and
   converting the role-based protected resource into an attribute-based protected resource associated with the implemented attribute-based access control policy.

10. The method of claim 9, further comprising:
   for each candidate attribute-based access control policy, determining and providing information describing a percentage of the identified set of user accounts that satisfy the candidate attribute-based access control policy.

11. The method of claim 9, further comprising:
   before implementing the attribute-based access control policy, adjusting the attribute-based access control policy based on input from an administrator.

12. The method of claim 11, further comprising:
   determining and providing information describing a number of user accounts that satisfy the adjusted attribute-based access control policy.

13. The method of claim 9, further comprising:
   adjusting the identified set of user accounts based on input from an administrator, wherein the set of user account attributes queried is based on the adjusted set of user accounts.

14. The method of claim 9, wherein the set of candidate attribute-based access control policies is generated using a machine learning model that determines relevant attributes to define the set of candidate attribute-based access control policies, wherein the machine learning model is trained using a previously implemented attribute-based access control policy.

15. The method of claim 9, wherein the predetermined criterion is based on a percentage of the identified set of user accounts that satisfy the candidate attribute-based access control policy.

16. A computing system for implementing an access bridge to enable migration from a role-based access control management system to an attribute-based access control management system, the computing system comprising:

a processor coupled to memory that stores instructions, which, upon execution by the processor, cause the processor to:

provide a user interface for converting a role-based protected resource into an attribute-based protected resource;

receive information describing a selected role-based protected resource from an administrator operating the user interface;

identify a set of user accounts permitted to access the role-based protected resource based on a role-based access control policy associated with the selected role-based protected resource;

generate a set of candidate attribute-based access control policies based on user account attributes associated with the identified set of user accounts;

for each of the candidate attribute-based access control policies, determine and provide information describing a number of user accounts that satisfy the candidate attribute-based access control policy, wherein the information describing the number of user accounts describes at least one user account not in the identified set of user accounts permitted to access the role-based protected resource;

receive information describing a selected attribute-based access control policy from the set of candidate attribute-based access control policies;

implement the selected attribute-based access control policy; and convert the selected role-based protected resource into an attribute-based protected resource associated with the implemented attribute-based access control policy.

\* \* \* \* \*